US009665911B2

(12) United States Patent
Humpherys (10) Patent No.: US 9,665,911 B2
(45) Date of Patent: May 30, 2017

(54) SYSTEM AND METHOD TO DOCUMENT AND DISPLAY BUSINESS REQUIREMENTS FOR COMPUTER DATA ENTRY

(71) Applicant: Hartford Fire Insurance Company, Hartford, CT (US)

(72) Inventor: Jonathan David Humpherys, Simsbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 79 days.

(21) Appl. No.: 13/949,951

(22) Filed: Jul. 24, 2013

(65) Prior Publication Data
US 2015/0032478 A1    Jan. 29, 2015

(51) Int. Cl.
*G06Q 40/00* (2012.01)
*G06Q 40/08* (2012.01)

(52) U.S. Cl.
CPC .................. *G06Q 40/08* (2013.01)

(58) Field of Classification Search
USPC ............ 705/4, 30, 40, 5, 39, 37, 38, 325, 1, 705/14.72, 7.12, 21, 27.1; 726/6, 9, 19; 709/223, 229, 218, 201; 715/243, 517, 715/530; 713/176, 161, 190, 186; 707/10; 719/329, 217; 235/379, 380; 358/1.13
See application file for complete search history.

(56) References Cited

U.S. PATENT DOCUMENTS

| | | | |
|---|---|---|---|
| 6,810,414 B1* | 10/2004 | Brittain | G06F 17/30917 707/E17.125 |
| 7,533,336 B2* | 5/2009 | Jaffe | G06F 17/243 705/27.1 |
| 8,346,614 B2* | 1/2013 | Mehta | G06Q 30/06 705/14.72 |
| 8,429,597 B2 | 4/2013 | Prigge | |
| 2002/0032638 A1* | 3/2002 | Arora | G06Q 30/06 705/37 |
| 2003/0028419 A1* | 2/2003 | Monaghan | G06Q 10/06 705/7.12 |
| 2004/0030991 A1* | 2/2004 | Hepworth et al. | 715/507 |
| 2005/0065933 A1 | 3/2005 | Goering | |
| 2005/0144036 A1* | 6/2005 | Bell | G06Q 10/10 705/35 |

(Continued)

OTHER PUBLICATIONS

Wang, J., "Develop an E-commerce Site Using Web Classes: VB6 Web Classes: together with SQL Server 7, Provide Everything You Need to Build an E-commerce Site Quickly," Visual Basic Programmer's J., vol. 9, Issue 10, p. 40 (Sep. 1999).*

*Primary Examiner* — Tien Nguyen
(74) *Attorney, Agent, or Firm* — Ference & Associates LLC (57) ABSTRACT

An embodiment provides a real-time or dynamic collaborative computer data collection form prototype builder. An embodiment integrates several concepts in order to streamline the computer data collection form development process. In an embodiment a dataset is used to collect data entry form requirements and attributes about the user interface which are used by a program to render a computer data collection form. Change implementation is facilitated by permitting changes in the underlying data set to be reflected in the computer data collection form, e.g., as re-rendered by the system.

16 Claims, 8 Drawing Sheets

(56) References Cited

U.S. PATENT DOCUMENTS

| | | | |
|---|---|---|---|
| 2006/0047554 A1* | 3/2006 | Larsen et al. | 705/8 |
| 2008/0162316 A1* | 7/2008 | Rampell | G06Q 30/0207 705/35 |
| 2008/0288573 A1* | 11/2008 | Bellotti | G06F 17/30041 709/201 |
| 2008/0289032 A1* | 11/2008 | Aoki | G06F 21/32 726/19 |
| 2009/0019133 A1* | 1/2009 | Brimley | G06F 17/30902 709/218 |
| 2009/0235087 A1* | 9/2009 | Bird | G06F 21/10 713/190 |
| 2010/0023517 A1* | 1/2010 | V. et al. | 707/6 |
| 2010/0088139 A1 | 4/2010 | Rahi et al. | |
| 2010/0131392 A1* | 5/2010 | Archer | G06Q 30/02 705/26.1 |
| 2010/0138389 A1* | 6/2010 | Snapp | 707/638 |
| 2011/0112932 A1* | 5/2011 | Chen | G06Q 10/20 705/27.1 |
| 2011/0131273 A1 | 6/2011 | Merissert-Coffinières et al. | |
| 2012/0023011 A1* | 1/2012 | Hurwitz | G06Q 20/10 705/39 |
| 2012/0066004 A1* | 3/2012 | Lee | 705/4 |
| 2012/0226626 A1 | 9/2012 | Venkateswaran et al. | |
| 2012/0303389 A1* | 11/2012 | Friedman | 705/4 |
| 2012/0317501 A1 | 12/2012 | Milou | |
| 2012/0330769 A1* | 12/2012 | Arceo | G06Q 20/4014 705/21 |
| 2013/0097687 A1 | 4/2013 | Storm | |
| 2013/0138524 A1* | 5/2013 | Sharma | 705/26.1 |
| 2014/0164285 A1* | 6/2014 | Ashburn | G06Q 40/06 705/36 R |

* cited by examiner

601 — Broker of Record

602 — Policy
603 — Policy Number — (for example, (UENMD9999))
604 — Effective Date — Note:

605 — Broker Change Information
606
607 — New Producer Code
608 — Please Upload
Upload File — [Choose File] No file chosen
Accepted file types are .doc, pdf, xls.

609 — Additional Policies to Change (optional)
610 — Policy Number 1
611 — Policy Number 2
612 — Policy Number 3
613 — Policy Number 4

SYSTEM AND METHOD TO DOCUMENT AND DISPLAY BUSINESS REQUIREMENTS FOR COMPUTER DATA ENTRY

BACKGROUND OF THE INVENTION

In the insurance industry, as with other endeavors, many processes require gathering of data. For example, a broker may be changed for a particular policy and this change is documented. For various reasons (e.g., regulatory compliance, best practices, business goals, etc.) particular types of standardized data fields are collected. A computer data collection form may be generated to facilitate this process. The computer data collection form may include standard format data collection fields, e.g., text boxes for data entry and collection, drop down menus, radio buttons, and the like.

In order to generate such computer data collection forms a multi-step process is typically employed. As an example, various user groups participate in the process of generating such computer data collection forms. Example user groups include business users (i.e., users interested in the actual data being collected). The business users may for example inform decisions regarding what data is actually being collected by the form. Additionally, designers may be involved in the process and participate in decisions regarding how the computer data collection form looks or is laid out on screen. Moreover, information technology users are often involved in the process as participants that provide the coding (e.g. HTML coding) of the data used to generate the computer data collection form.

Many projects therefore are related to the collection of data by some person within a computer data collection form presented in a web browser. The computer data collection form may be used to provide a quote application, an endorsement, a request for information, etc. As above, for each of these projects there is also a lengthy requirements gathering process, user experience documentation creation (to visualize the future state user interface), business analysis documentation, and development time.

SUMMARY OF THE INVENTION

An embodiment provides a real-time or dynamic collaborative computer data collection form prototype builder. An embodiment integrates several concepts in order to streamline the computer data collection form development process.

In an embodiment a dataset is used to collect data entry form requirements and attributes about the user interface. Label, field type, hide/show logic, and many other attributes may be used. The dataset may be accessed by many users and permissions (e.g., view, edit, modify, etc.) may be set using dataset management tools. Additionally, dataset management software enables changes to the dataset to be tracked as well as many other features that are beneficial over using a conventional approach.

In an embodiment a program is used to retrieve information from the dataset and present the information within an application in real-time. Thus, an embodiment builds the computer data collection form based on existing dataset information such that its current form may be viewed. This facilitates visualization of the user interface and promotes a streamlined modification of the computer data collection form to ensure that it is collecting the appropriate data (e.g., via use of appropriate fields) and has the look and feel desired by various users.

An embodiment may employ a template structure for the user interface elements. A template may contain the information necessary to display the desired user interface. An embodiment therefore allows multiple users (e.g., multiple business users) working on a large project to interact with the dataset simultaneously and view the end state user interface. Other users, e.g., a business customer, IT architects, and other stakeholders may additionally view change implementation in real time. A single document (dataset) may be used to document all characteristics of the user interface rather than, e.g., multiple copies of a spreadsheet containing requirements and features. Thus, an embodiment provides an open collaborative system that may be viewed as a streamlining of IT documentation creation and software delivery for a project.

In summary, one embodiment provides a computerized method for creating a computer data collection insurance form interface. The method includes storing, in a memory device, a dataset template including a plurality of fields, the plurality of fields including at least two insurance related fields and corresponding to data collection points in a user interface displayed in a web browser. The method further includes associating the plurality of fields to executable code, the executable code being stored in a memory device and configured to be executed by at least one processor and render data of a data collection point in a portion of the web browser display. In the method, user input data into at least one of the plurality of fields of the dataset template may be stored in a memory device. The user input data stored is rendered in the at least one field of the dataset template as a data collection point in the web browser display. Updated user input data into the at least one field of the dataset template may be stored and the method may include re-rendering the data collection point in the web browser display using the updated user input data.

Another embodiment provides a system for building a computer data collection form interface. The system includes a device having at least one processor and at least one memory device storing instructions accessible to the at least one processor, the instructions being executable by the at least one processor to store a dataset template including a plurality of fields, the plurality of fields corresponding to data collection points in a user interface displayed in a web browser and associate the plurality of fields to executable code, the executable code being stored in a memory device and configured to be executed by the at least one processor and render data of a data collection point in a portion of the web browser display. The system stores, in a memory device, user input data into a field of the dataset template and renders, using the at least one processor, the user input data stored in the field of the dataset template as a data collection point in the web browser display. The system further stores updated user input data into the field of the dataset template and re-renders the data collection point in the web browser display using the updated user input data.

A further embodiment provides a computer program product. The computer program product includes a storage medium having computer readable program code embodied therewith, the computer readable program code comprising computer readable program code configured to store, in a memory device, a dataset template including a plurality of fields, the plurality of fields corresponding to data collection points in a user interface displayed in a web browser. The computer readable program code is configured to associate the plurality of fields to executable code, the executable code being stored in a memory device and configured to be executed by at least one processor and render data of a data collection point in a portion of the web browser display. The computer readable program code is configured to store, in a memory device, user input data into a field of the dataset template. The computer readable program code is configured to render, using the at least one processor, the user input data stored in the field of the dataset template as a data collection point in the web browser display. The computer readable program code is configured to store updated user input data into the field of the dataset template and re-render the data collection point in the web browser display using the updated user input data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DESCRIPTION OF CERTAIN ILLUSTRATIVE EMBODIMENTS

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described herein, for each of project in which a computer data collection form is to be generated and used to collect data, there is a lengthy requirements gathering process, user experience documentation creation (to visualize the future state user interface), business analysis documentation, and development time. This creates a variety of challenges for the various participants.

For example, frequently a final user-interface is not seen by the project team and business stakeholders until the development team enters quality assurance. This is because there has conventionally been no easy way to visualize the computer data collection form prior to its actual deployment (e.g., after it is coded). Previous attempts at addressing this problem included providing a mock up or prototype, e.g., as a picture in PHOTOSHOP program of what the computer data collection form may appear as once coded.

Additionally, the business requirement documentation for such computer data collection forms is often difficult to read and difficult for non-specialized users to understand. This is problematic in that frequently what the business customers are signing off on is not understood, so it does not meet their expectations. A user experience group may create a wireframe or mockup of the end state user interface, but often this is a point-in-time representation of the user interface and as requirements change, either the user interface visual needs to be updated separately, or the two deliverables are not synchronized. Moreover, even if a user-interface is designed for use to show future state, a static visual will not illustrate the interaction the end user has. An interactive prototype may be developed, but the effort to do this by hand would be considerable.

Additionally, many of these user-interfaces are different variations of the same user interface elements, e.g., with different labels, help information, etc. Thus, computer data collection form development projects often duplicate work unnecessarily.

Figure 1:
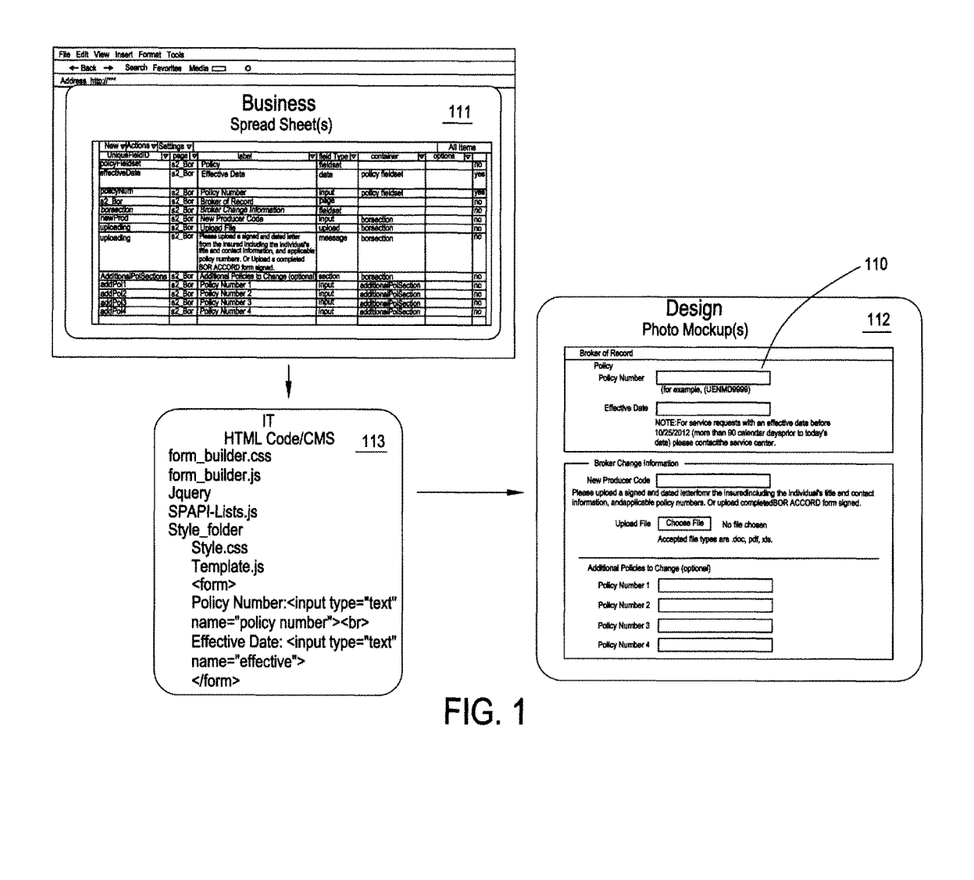
FIG. 1 illustrates a conventional documentation creation and software delivery for a project flow.

Common practice, as outlined in FIG. 1, involved many users that start with a spreadsheet, e.g., an EXCEL file 111, is used and might be passed to users for updates as needed. Designers may provide photo mockup(s) 112, e.g., using a program such as PHOTOSHOP or like program, to illustrate what the computer data collection form may look like. Thereafter, information technology team members may provide the actual code 113 based on the requirements of the spreadsheet(s) 111 and the visual characteristics included in the mockup(s) 112 to form a computer data collection form including, e.g., a data collection point 110, here illustrated as a text box for entry of a policy number. Additional efforts were put in to track changes, e.g., in the spreadsheet(s) 111 and which user implemented the change. Therefore, conventional multi-stage development of computer data collection forms for data collection has been fraught with complications and unnecessary duplication of work by the various users involved.

Figure 2:
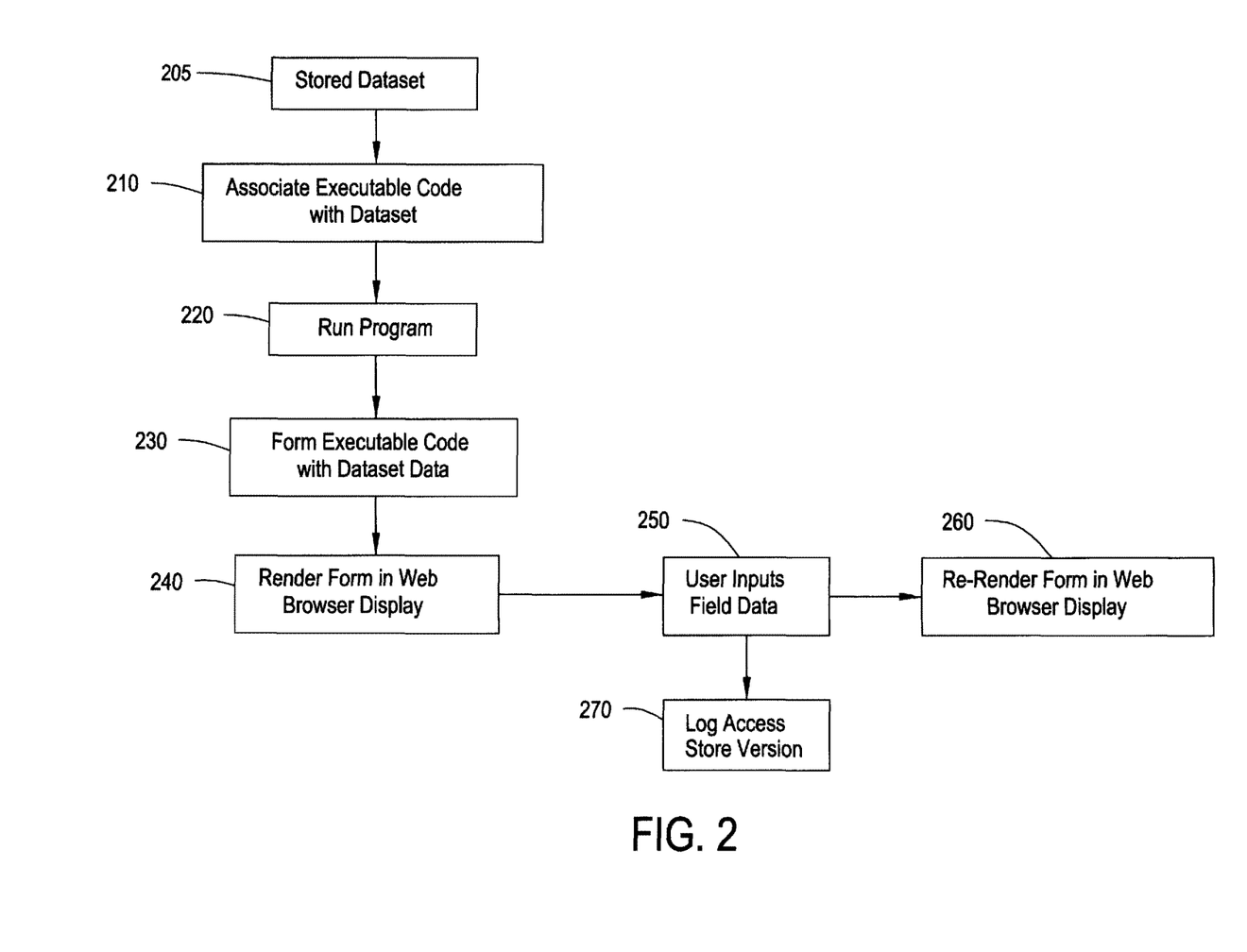
FIG. 2 illustrates a documentation and software delivery project flow according to an embodiment.

In contrast, generally referring to FIG. 2, an embodiment provides a real-time or dynamic collaborative computer data collection form prototype builder. An embodiment integrates several concepts in order to streamline the computer data collection form development process.

In an embodiment a dataset (e.g., a SHAREPOINT dataset) is used to collect data entry form requirements and attributes about the user interface. Label, field type, hide/show logic, and many other attributes may be used. The dataset may be accessed by many users and permissions (e.g., view, edit, modify, etc.) may be set using dataset management tools. Additionally, dataset management software enables changes to the dataset to be tracked as well as many other features that are beneficial over using a conventional approach (e.g., locally stored and iteratively modified spreadsheet file).

In an embodiment a program (e.g., a Javascript program) is used to retrieve information from the dataset and present the information within an application (e.g., an Internet or web browser) in real-time. Thus, an embodiment builds the computer data collection form based on existing dataset information such that its current form may be viewed. This facilitates visualization of the user interface and promotes a streamlined modification of the computer data collection form to ensure that it is collecting the appropriate data (e.g., via use of appropriate fields) and has the look and feel desired by various users.

An embodiment may employ a template structure for the user interface elements. A template is an organization of data of a dataset and may contain the information necessary to display the desired user interface (e.g., HTML and Cascading Style Sheet (CSS) styles).

An embodiment therefore allows multiple users (e.g., multiple business users) working on a large project to interact with the dataset simultaneously and view the end state user interface. Other users, e.g., a business customer, IT architects, and other stakeholders may additionally view change implementation in real time. A single document (dataset) may be used to document all characteristics of the user interface rather than, e.g., multiple copies of a spreadsheet containing requirements and features. Thus, an embodiment provides an open collaborative system that may be viewed as a streamlining of IT documentation creation and software delivery for a project.

In FIG. 2 for example, executable code is associated with the dataset at 210. For example, the executable code may comprise core code of a program (e.g., Javascript program) used to access dataset information (e.g., field entries) as well as actual HTML code, for example placeholder code that will be populated with or completed by data of the dataset.

A program is run at 220, e.g., a web browser application. The program of executable code is run by the program, e.g., loaded into memory and executed by a processor, in order to access the dataset. In an example, a web browser is run and pointed to a page which in turn runs the executable code. The executable code runs and in turn accesses information stored in the dataset. This may involve for example running a Javascript program at 220 to access a dataset containing user input field entries and attributes (e.g., the location of the field entries within the form, their relation to one another, etc.) to form the instance of the form, i.e., to form the executable code with the dataset data at 230 for rendering at 240.

Figure 3:
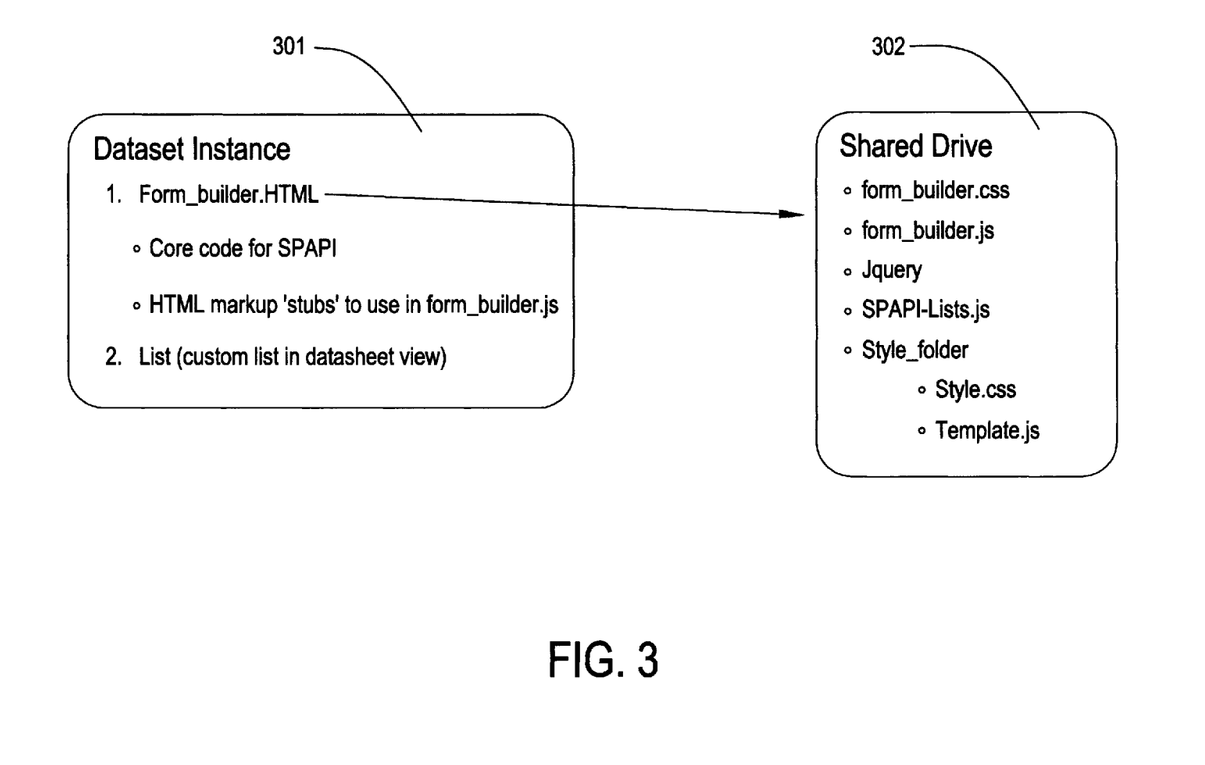
FIG. 3 illustrates an example of a dataset instance.

Referring to FIG. 3, an example instance for building a computer data collection form is illustrated. In the example, a dataset instance 301 includes an HTML page, e.g., to be loaded into a web browser program, that includes core code. In the example, the dataset instance 301 includes core code for SHAREPOINT Application Programming Interface (APIs) (noting that other libraries of APIs may be employed) and includes HTML markups or "stubs" of executable code for use in a suitable program, e.g., a JavaScript program, in this example termed form_builder.js. Moreover the dataset instance includes the data (or references thereto) of the dataset, illustrated in FIG. 3 as the "list", or the custom list of dataset data in a datasheet.

As illustrated, the page, e.g., Form_builder.HTML in FIG. 3, may include a reference or linkage (path) to data, e.g., as for example stored on a drive (shared drive 302 in FIG. 3). Thus, the HTML page will have access to various data needed to implement the instance. In the example of FIG. 3, the shared drive 302 includes style sheet information (e.g., form_builder.css), JavaScript code (e.g., form_builder.js), library data (e.g., Jquery or other library, SPAPI_Lists.js or other APIs), as well as style information (e.g., Style_folder, including for example style sheet information (e.g., Style.css file indicating style information for the look and feel of the form to be rendered) and template information (e.g., Template.js file specifying the HTML code)). The page or program therefor may access other data or information, e.g., stored on a shared drive 302 having information for implementing different instances (e.g., across multiple forms), including information for executing various programs or sub-routines used to form a computer data collection form in a web browser display.

Referring back to FIG. 2, in an embodiment, the executable code of the program is run to form the data of the dataset into a computer data collection form at 230. For example, an embodiment may incorporate user input information from the dataset into the HTML code placeholders or stubs referred to in FIG. 3. Forming such executable code, e.g., HTML code populated with data from the dataset, allows an embodiment to render the computer data collection form in an application such as a web browser display at 240. This permits a visual presentation of the computer data collection form, including the elements indicated in the dataset, for review by a user in real time.

If the user wishes to modify any portion of the computer data collection form, e.g., via inputting different or new field data (or a new field entirely, etc.), an embodiment provides the user with an option to modify the field data of the dataset at 250. This changes the data of the underlying dataset and thus permits the web browser display to be re-rendered for user review at 260. This may include for example updating the HTML code with new data from the dataset, e.g., as input by the user at 250.

An embodiment permits convenient storage of various versions of the computer data collection form by saving data from which the form is compiled at different points in time. For example, a version may be stored at 270 after a first update to the underlying dataset, e.g., storage of an updated version of the dataset. Thus, if a user inputs new data into the dataset or otherwise modifies the computer data collection form (e.g., modifies the HTML code placeholders, etc.), an embodiment may store another version. Therefore, users may implement various changes, view the results in updated renderings, and keep the changes or roll back to prior version in real time or substantially instantaneously. In an embodiment, a user therefore may easily modify the computer data collection form by modifying the underlying dataset entries. Although the executable code or the template (e.g., the design or inclusion of various fields) may be modified, all a user needs to do to make many changes is modify the underlying dataset entries.

An embodiment permits tracking of user changes to easily identify a user that implemented the change, what the change was and when the change was made. For example, if a user inputs new or different field data into the dataset at 250, an embodiment may log the access to the dataset, e.g., including an identification of the user that accessed the dataset, when and what change was made. This may prove advantageous in determining the source of a dataset change which in turn imparts a change to the computer data collection form rendering (or re-rendering).

Figure 4:
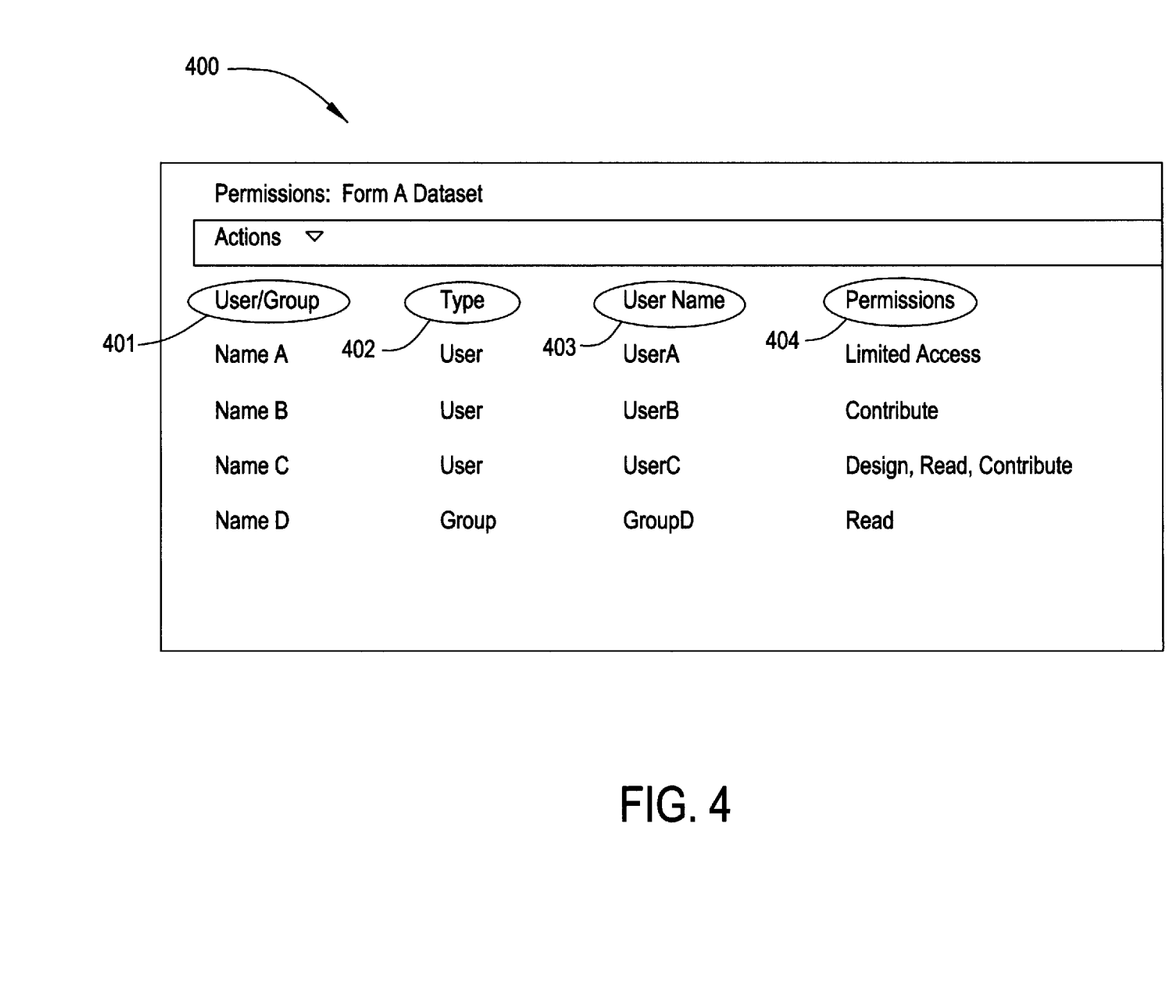
FIG. 4 illustrates an example of user permissions.

In this respect, referring to FIG. 4, an embodiment may utilize dataset management capabilities to authorize users of varying levels. For example, a user may simply be authorized to view or read a dataset and the computer data collection form that is formed therefrom. Alternatively, a user may have an increased level of permission, e.g., to access and modify information (e.g., contribute) impacting the computer data collection form, for example changing, contributing to the dataset by adding or removing information in the dataset and/or designing the from by modifying another information source, e.g., modification of HTML code.

As illustrated in FIG. 4, a permissions screen 400 lists various permissions that may be assigned to different user(s) or group(s) 401. Thus, a first user may be listed as a first type 402 of user, have identifying information such as a user name 403 listed, and the permission level 404 indicated. Thus, a user with limited access may only have permission to view and modify certain datasets, or fields thereof, for certain forms. Alternatively, a user with a contribute level of permission may be able to contribute to the underlying dataset, making changes thereto. Alternatively, a user with design, read and contribute permission may be able to view the forms/datasets, make modifications thereto, as well as implement design level changes (e.g., to a template format or to HTML code). As another example, a read level of access may only permit a user to read the dataset or view the computer form, but make no changes thereto. The example permissions listed in FIG. 4 are non-limiting examples and others may be suitable for different contexts.

Figure 5:
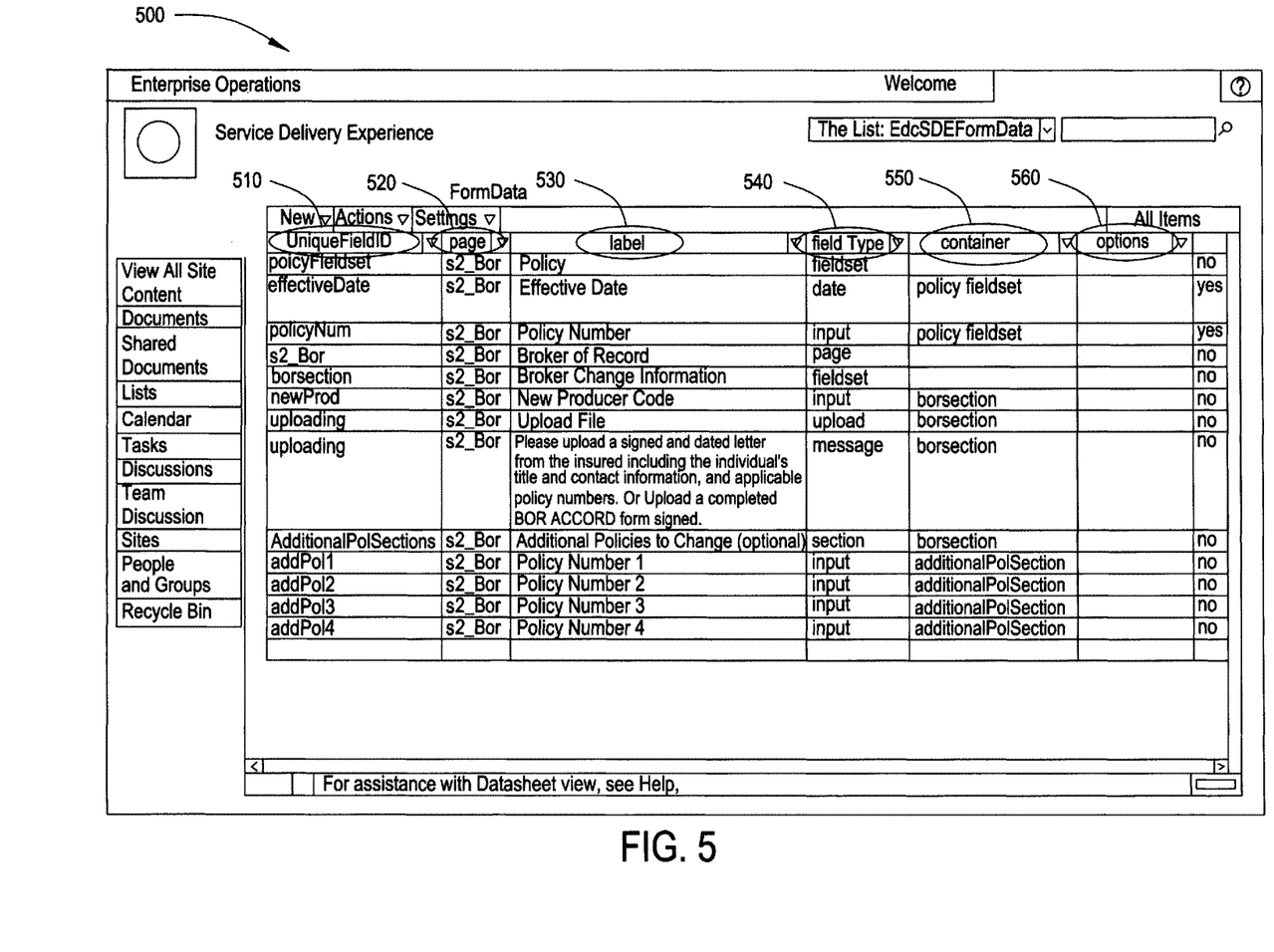
FIG. 5 illustrates an example dataset template view according to an embodiment.

Illustrated in FIG. 5 is an example dataset template view screen 500. This dataset template view screen 500 corresponds for example to the view a user has of the dataset from which a computer data collection form is derived. In the view 500, the user may view and modify various fields of data in the template. For example, a user (if authorized) may view or change data in a UniqueField entry 510. This data entry 510 field corresponds to the field identifier for which the remaining columns of data entries apply. An example UniqueField 510 entry would include "effective date" or "policy number", etc. A page field 520 indicates to which page (computer data collection form) the data fields apply. An example page field 520 includes a "broker of record" change page. A label field 530 includes data entry for labels of the various components (e.g., data collection element, section headers, etc.) of the computer data collection form. Example label fields 530 include but are not limited to "broker of record", "broker change information", "additional policies to change", etc. A field type 530 is included in the view 500. Field types 530 indicate what the nature of the element is. For example, a field type 530 may indicate an element is a "message" or an "input" element, etc. A container element 550 indicates what portion of the page or computer data collection form the element is incorporated into. Example container elements 550 include but are not limited to "section" and "field set", etc. An options field 560 is included and may be used to indicate any options available for the element in question.

Figure 6:
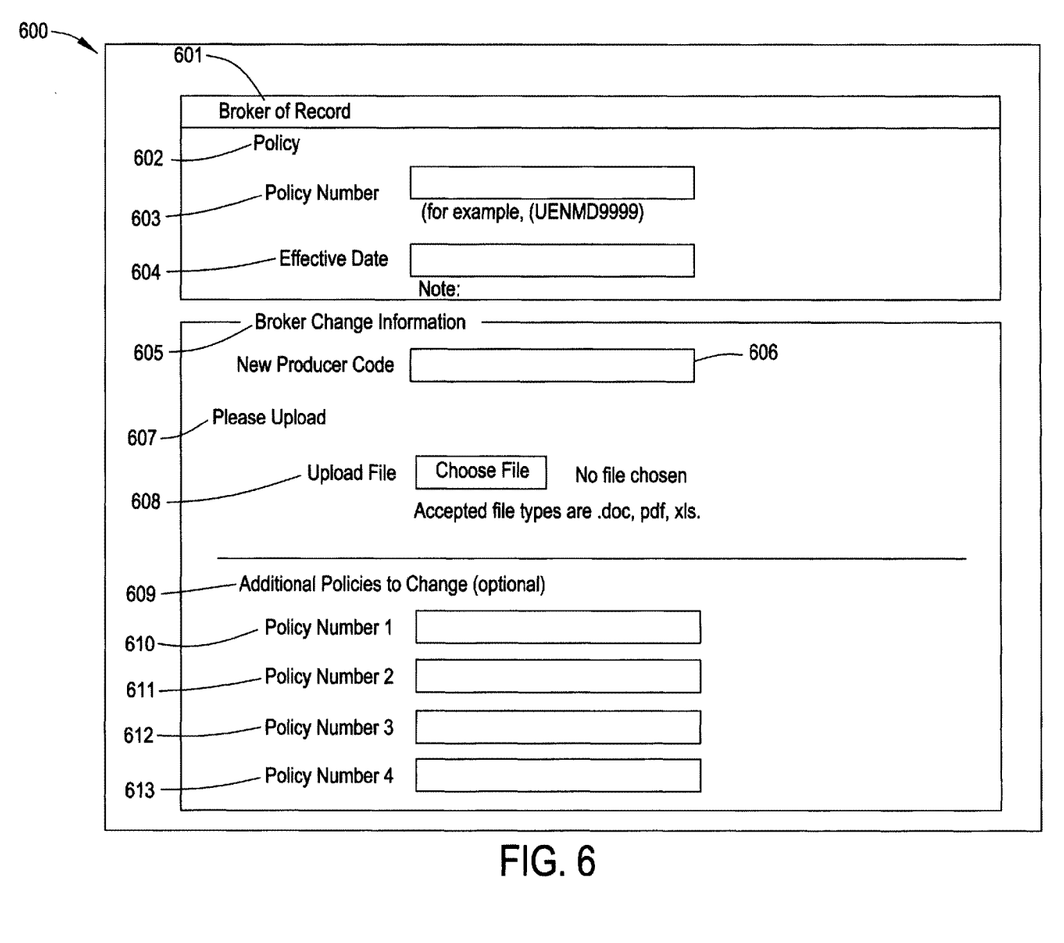
FIG. 6 illustrates an example computer data collection form according to an embodiment.

Referring to FIG. 6, it can be seen that the underlying information contained in dataset template view 500 is used to form a computer data collection form or page 600 illustrated in FIG. 6. By modifying or changing the dataset, the form 600 will be changed, e.g., in real time as it is re-rendered by the system. In the example of FIG. 6, the computer data collection form 600 is populated with entries in the dataset template as viewed in FIG. 5. For example, the dataset contains a label 601 "Broker of Record" (e.g., for example as entered into data field 530 of FIG. 5). This is used by a program (e.g., Javascript program) to populate or form executable code that can be rendered on display, e.g., as a web browser display such as computer data collection form 600.

The label "Broker of Record" is placed at the top of the page, i.e., it would be contained in the dataset as a page-level element. Thus, the program inserts the information from the dataset, in this example "Broker of Record" at the top of the page. To modify this, a user would simply modify the underlying dataset (e.g., input a different label) and re-render the computer data collection form to visualize the change.

Other examples included in FIG. 6 include the following labels: "policy" label 602, "Policy Number" label 603, "Effective Date" label 604, "Broker Change Information" label 605, "New Producer Code" label 606, "Please upload" label 607, "Upload File" label 608, "Additional Policies to Change (optional)" label 609, and "Policy Number" labels 610-613. Each of these labels is derived from and may be changed by modifying the dataset, e.g., as viewed in a dataset template view 500 in FIG. 5. Various portions of the dataset may be modified, e.g., reorganized, to implement changes in the rendered computer data collection form 600.

For example, element "New Producer Code" is currently contained in the dataset as an "input" type label, and thus provides a text box in the computer data collection form 600 for entry of information (i.e., a new producer code). This may be modified to another type of element, e.g., a message element such as "Please upload" without an input element if desired. To implement such a change, a user need only modify the underlying dataset appropriately (e.g., change the "New Producer Code" label to a message type label) and re-render the computer data collection form 600. If additional changes are desirable, e.g., changing the message from "New Producer Code" to "No New Producer Code Required", the user may input such a change to the label information of the dataset and re-render the page.

Accordingly, a user may modify the rendered web browser view by modifying the underlying dataset. Additionally or in the alternative, more substantial changes may be made, e.g., to the HTML code itself, such as affecting the structure of the rendered page (e.g., the ordering of elements, their appearances, etc.). Therefore, embodiments allow for users to update and visualize such computer data collection forms as part of the development process and track changes made such that the evolution of the computer data collection form is readily at hand.

In a dataset, such as illustrated in FIG. 5, the example elements 510-560 are arranged in tabular format in columns. The columns store information about each item in the dataset list. The columns of the dataset may vary depending upon the design of the dataset and the data fields or elements to be utilized in the computer data collection form. The columns and their type (e.g., including text input, number input, choices, etc.) may be edited. Table 1 includes some example columns and column types. As shown in Table 1, a column or dataset element "Label", e.g. corresponding to element 530 of FIG. 5, may include multiple lines of text entry, such as the label 530 of "uploading" in FIG. 5.

TABLE 1

Columns and Type Descriptions

| Column | Type |
| --- | --- |
| Title | Single line of text |
| UniqueFieldID | Single line of text |
| Page | Single line of text |
| Label | Multiple lines of text |
| FieldType | Choice |
| Container | Single line of text |
| Options | Multiple lines of text |
| Required | Choice |
| HelpText | Multiple lines of text |
| FieldOrder | Number |
| Notes | Multiple lines of text |
| CreatedBy | Person or Group |
| ModifiedBy | Person or Group |

Figure 7:
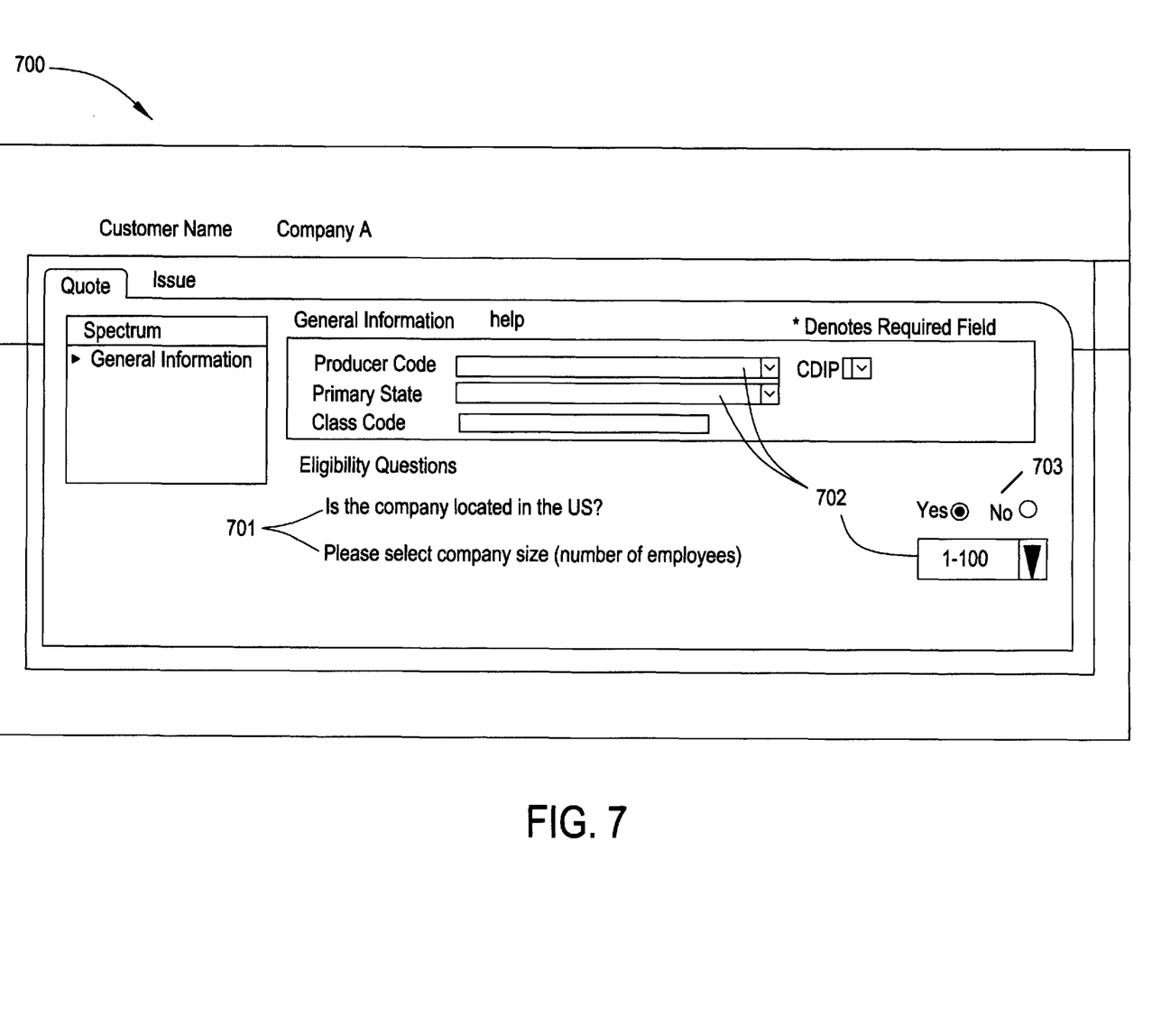
FIG. 7 illustrates another example computer data collection form according to an embodiment.

In FIG. 7 another example computer data collection form 700 is illustrated. It will be understood that, similar to form 600, the underlying information contained in a dataset template is used to form the computer data collection form or page 700 illustrated in FIG. 7. The dataset provides the underlying format and layout of the form 700 as well as the textual information, e.g., eligibility questions 701. Moreover, the dataset indicates, e.g., in column type information, the modes or mechanisms for collecting information using the form 700.

Thus, in the example of FIG. 7, a user may provide information to the eligibility form 700 via making selections or choices using drop down menus 702 or radio buttons, e.g., radio button 703. Other mechanisms (e.g., filling in a text box) may be utilized. It will be understood that in some forms, logic may be provided in the underlying dataset such that, if a choice is made, e.g., selecting radio button 703 to indicate non-US company location, other actions may be taken in the form, e.g., rendering other fields (e.g., one or more of drop-down menus 702) inoperable (e.g., to indicate that they are unnecessary or inapplicable). Thus, logic may be included in the form such that its rendering in the web browser is updated based on user input(s).

Figure 8:
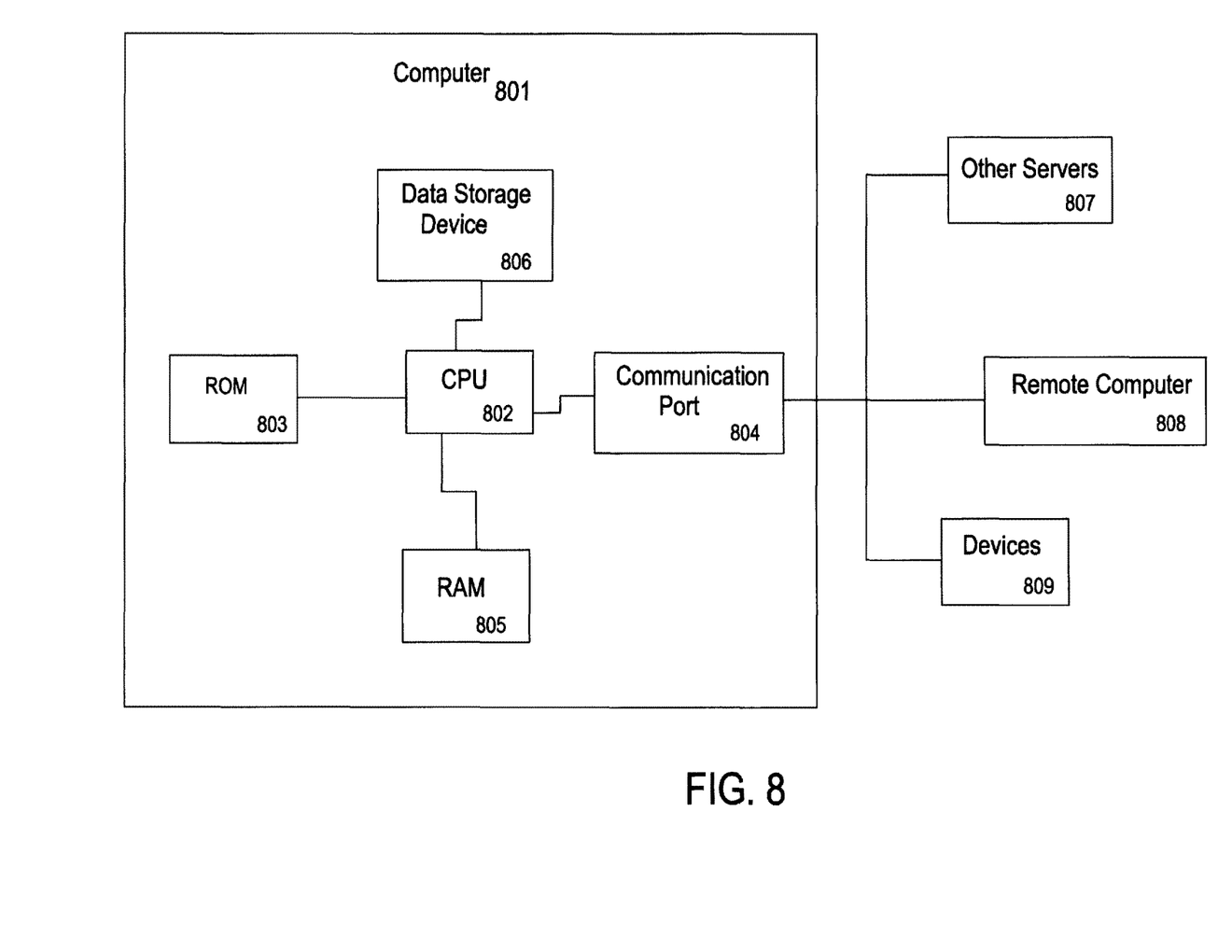
FIG. 8 illustrates a block diagram of an example computing architecture suitable for implementing the embodiments described herein.

FIG. 8 illustrates a block diagram of a computing architecture suitable for implementing a computing device on which a system for building a computer data collection form/interface according to an embodiment may be implemented. Computer 801 comprises at least one central processing unit (CPU)/processor 802, at least one read-only memory (ROM) 803, at least one communication port or hub 804, at least one random access memory (RAM) 805, and one or more data storage devices 106. As illustrated, various elements are in communication with the CPU 802 to facilitate the operation of the computer 801. The computer 801 may be configured in many different ways. For example, computer 801 may be a conventional stand-alone computer or alternatively, the function of computer 801 may be distributed across multiple computing systems and architectures.

Computer 801 may be configured in a distributed architecture, wherein data storage device 806 and processors (e.g., CPU 802) are housed in separate units or locations. Some such units may perform primary processing functions and contain at a minimum, a general controller or a CPU 802, a ROM 803, and a RAM 805. In such an embodiment, each of these units may be attached to a communications hub or port 804 that serves as a primary communication link with other servers 807, client or user computers 808 and other devices 809. The communications hub or port 804 may have processing capability itself, e.g., serving primarily as a communications router. A variety of communications protocols may be part of the system, including but not limited to: Ethernet, SAP, SAS™, ATP, BLUETOOTH™, GSM and TCP/IP or other suitable communication protocol for the type of data being communicated and/or the devices involved in the communication.

The CPU 802 may include one or more processors of various types. The CPU 802 is in communication with the communication port 804 through which the CPU 802 communicates with other devices such as other servers 807, remote computer 808, or devices 809. The communication port 804 may include multiple communication channels for simultaneous communication with, for example, other processors, servers or client terminals. Devices in communication with each other need not be continually transmitting data to/receiving data from each other. On the contrary, such devices need only transmit to each other as necessary, may actually refrain from exchanging data most of the time, and may require several steps to be performed to establish a communication link between the devices.

The CPU 802 may also be in communication with the data storage device 806. The data storage device 806 may comprise an appropriate combination of magnetic, optical and/or semiconductor memory, and may include, for example, RAM, ROM, flash drive, an optical disc such as a compact disc and/or a hard disk or drive. The CPU 802 and the data storage device 806 each may be, for example, located entirely within a single computer 801 or connected to each other by a communication medium, such as a USB port, serial port cable, a coaxial cable, a Ethernet type cable, a telephone line, a radio frequency transceiver or other similar wireless or wired medium or combination of the foregoing. For example, the CPU 802 may be connected to the data storage device 806 via the communication port 804.

The data storage device 806 may store, for example, (i) a program (e.g., computer program code and/or a computer program product) adapted to direct the CPU 802 in accordance with the embodiments described throughout, and particularly in accordance with the processes described in detail with regard to rendering a computer form with the CPU 802; (ii) databases adapted to store information required by a program, e.g., various dataset information, including but not limited to the field data and executable code referred to throughout, as referenced herein in connection with various embodiments.

The instructions or computer readable program code may be read into a main memory of the processor from a computer-readable medium other than the data storage device 806, such as from a ROM 803 or from a RAM 805. While execution of sequences of instructions in the program causes the CPU 802 to perform the process steps described herein, hard-wired circuitry may be used in place of, or in combination with, software instructions for implementation of the processes of the various example embodiments described throughout. Thus, embodiments are not limited to any specific combination of hardware and software.

It will be readily understood that certain embodiments may include a computer program product. The computer program product may include a storage medium. The term "storage medium" is defined herein as a non-signal medium. Such a storage medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of storage media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, etc.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A computerized method for rendering a web page during creation of the web page and prior to completion of the web page using a collaborative form prototype builder, comprising:
    storing, in a shared drive, a dataset template including:
    data including a plurality of fields, the plurality of fields including data collection fields;
    providing a program of executable code that is run by a web browser and that uses the dataset template and web page code to provide a web page version in a web browser of a remote client device;
    assigning, using at least one processor, different user permissions for accessing, viewing and updating data of the dataset template;
    receiving, from a first remote client device, a request to access the dataset template;
    determining, using the at least one processor and based on the permissions, that the first remote client device is permitted to alter the dataset template;
    receiving, from the first remote client device, user input data that alters the web page code;
    storing the user input data into the dataset template;
    receiving, from a web browser of the first remote client, a request to view a current web page version;
    automatically providing, using the at least one processor, to the web browser running on the first remote client device, an altered version of the web page based on the user input data that has been incorporated into the dataset template;
    said providing comprising pointing the web browser of the first remote client to a page that runs the program of executable code and extracts the data from the dataset template from the shared drive and displays the data in the web browser of the first remote client;
    receiving, from a second remote client device, a request to access the dataset template;
    granting, using the at least one processor, read only access to the dataset template to the second remote client device based on the permissions;
    providing, using the at least one processor, to a web browser running on the second remote client device, the altered view of the web page;
    said providing comprising pointing the web browser of the second remote client to the page that runs the program of executable code and extracts the data from the dataset template from the shared drive and displays the data in the web browser of the second remote client; and
    thereafter providing, using the at least one processor, a completed web page version based on all user input data included in the dataset template;
    wherein the completed web page is provided at a web site for end user client device access;
    said completed web page incorporating data of the dataset template, wherein the executable code is omitted and does not access the dataset template from the shared drive for end user client access to the completed web page.

2. The method of claim 1, further comprising associating, using at the at least one processor, at least one user with an access permission to the dataset template and at least one user with a modification permission to the dataset template.

3. The method of claim 1, further comprising storing, using the at least one processor, a first version of the dataset template including an indicator that the stored dataset template is a first version.

4. The method of claim 3, further comprising storing, using the at least one processor, a second version of the dataset template including an indicator that the stored dataset template is a second version.

5. The method of claim 1, wherein the completed web page comprises a computer data collection form for collecting insurance data via one or more data collection points contained therein.

6. A system for rendering a web page during creation of the web page and prior to completion of the web page using a collaborative web page prototype builder, comprising:
    a device having at least one processor and at least one memory device storing instructions accessible to the at least one processor, the instructions being executable by the at least one processor to:
    store, in a shared drive, a dataset template including:
    data including a plurality of fields, the plurality of fields corresponding to data collection points;
    provide a program of executable code that is run by a web browser and that uses the dataset template and web page code to provide a web page version in a web browser of a remote client device;
    assign different user permissions for accessing, viewing and updating the dataset template;
    receive, from a first remote client device, a request to access the dataset template;
    determine, based on the permissions, that the first remote client device is permitted to alter the dataset template;
    receive, from the first remote client device, user input data that alters the web page code;
    store the user input data into the dataset template;
    receive, from a web browser of the first remote client, a request to view a current web page version;
    automatically provide, to the web browser running on the first remote client device, an altered version of the web page that is altered based on the user input data that has been incorporated into the dataset template by pointing the web browser of the first remote client to a page that runs the program of executable code and extracts the data from the dataset template from the shared drive and displays the data in the web browser of the first remote client;
    receive, from a second remote client device, a request to access the dataset template;
    grant read only access to the dataset template to the second remote client device based on the permissions;

provide, to a web browser running on the second remote client device, the altered view of the web page by pointing the web browser of the second remote client to the page that runs the program of executable code and extracts the data from the dataset template from the shared drive and displays the data in the web browser of the second remote client; and thereafter provide a completed web page version based on all user input data included in the dataset template;

wherein the completed web page is provided at a web site for end user client device access;

said completed web page incorporating data of the dataset template, wherein the executable code is omitted and does not access the dataset template from the shared drive for end user client access to the completed web page.

7. The system of claim 6, wherein the instructions are further executable by the at least one processor to store, in a memory device, at least one additional field.

8. The system of claim 7, wherein the at least one additional field comprises an additional data collection point.

9. The system of claim 6, wherein the instructions are further executable by the at least one processor to associate, using at the at least one processor, at least one user with an access permission to the dataset.

10. The system of claim 6, wherein the instructions are further executable by the at least one processor to store, using the at least one processor, an identification of a user modifying the dataset.

11. The system of claim 6, wherein the instructions are further executable by the at least one processor to store, using the at least one processor, a first version of the dataset template as a first version and a second version of the dataset template as a second version.

12. The system of claim 11, wherein at least one of said insurance related fields are modified when the display is re-rendered.

13. The system of claim 6, wherein the dataset template includes insurance related fields comprising at least two of an insurance classification code, an insured state, an insurance policy number, and an insurance agent identifier.

14. The system of claim 6, wherein the completed web page comprises a computer data collection form for collecting insurance data via one or more of the data collection points contained therein.

15. A computer program product for rendering a web page during creation of the web page and prior to completion of the web page, comprising:

a non-transitory storage medium having computer readable program code embodied therewith, the computer readable program code being executable by a processor and comprising:

computer readable program code configured to store, in a shared drive, a dataset template including:

data including a plurality of fields, the plurality of fields corresponding to data collection points;

computer readable program code configured to provide a program of executable code that is run by a web browser and that uses the dataset template and web page code to provide a web page version in a web browser of a remote client device;

computer readable program code configured to assign different user permissions for accessing, viewing and updating data of the dataset template;

computer readable program code configured to receive, from a first remote client device, a request to access the dataset template;

computer readable program code configured to determine, based on the permissions, that the first remote client device is permitted to alter the dataset template;

computer readable program code configured to receive, from the first remote client device, user input data that alters the web page code;

computer readable program code configured to store the user input data into a field of the dataset template;

computer readable program code configured to receive, from a web browser of the first remote client, a request to view a current web page version;

computer readable program code configured to automatically provide, to the web browser running on the first remote client device, an altered version of the web page that is altered based on the user input data that has been incorporated into the dataset template by pointing the web browser of the first remote client to a page that runs the program of executable code and extracts the data from the dataset template from the shared drive and displays the data in the web browser of the first remote client;

computer readable program code configured to receive, from a second remote client device, a request to access the dataset template;

computer readable program code configured to grant read only access to the dataset template to the second remote client device based on the permissions;

computer readable program code configured to provide, to a web browser running on the second remote client device, the altered view of the web page by pointing the web browser of the second remote client to the page that runs the program of executable code and extracts the data from the dataset template from the shared drive and displays the data in the web browser of the second remote client; and computer readable program code configured to thereafter provide a completed web page version based on all user input data included in the dataset template;

wherein the completed web page is provided at a web site for end user client device access;

said completed web page incorporating data of the dataset template, wherein the executable code is omitted and does not access the dataset template from the shared drive for end user client access to the completed web page.

16. The computer program product of claim 15, wherein the dataset template includes insurance related fields comprising at least two of an insurance classification code, an insured state, an insurance policy number, and an insurance agent identifier.

* * * * *